Jan. 21, 1930.    H. F. JOSEPH    1,744,475
WEEDER AND SUBTILLING MACHINE
Filed May 12, 1927    5 Sheets-Sheet 1

INVENTOR
Harry F. Joseph
BY
Curtis V Bush  ATTORNEY

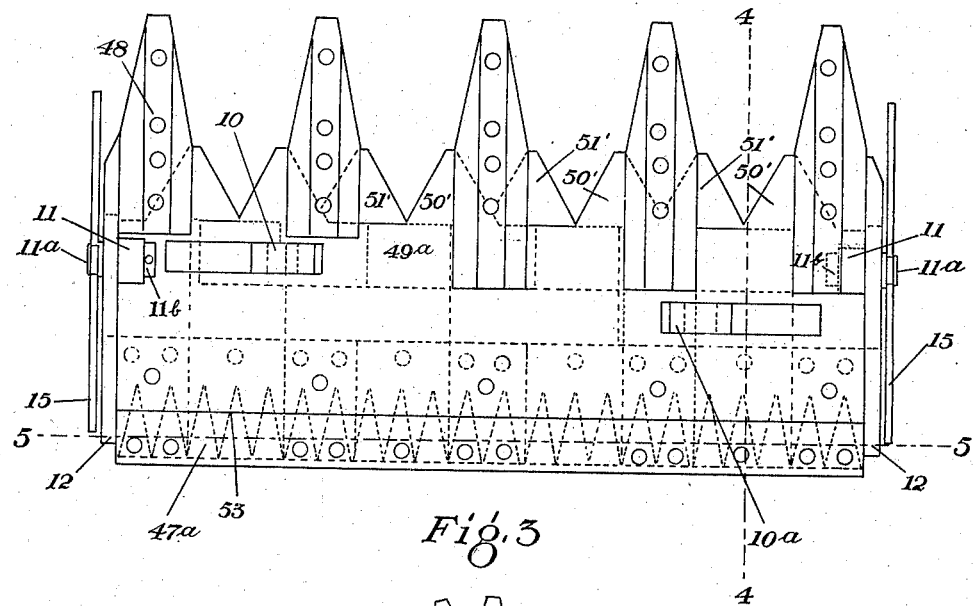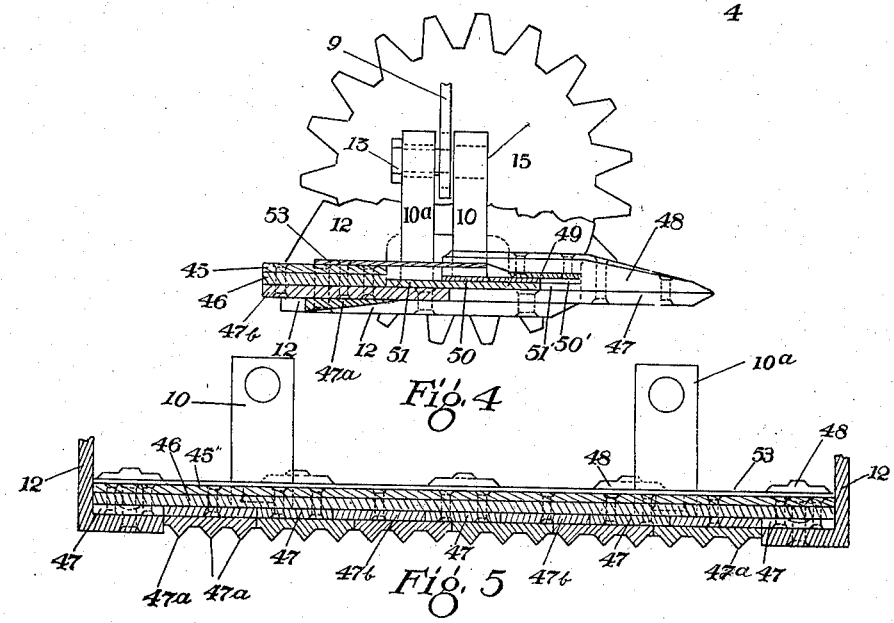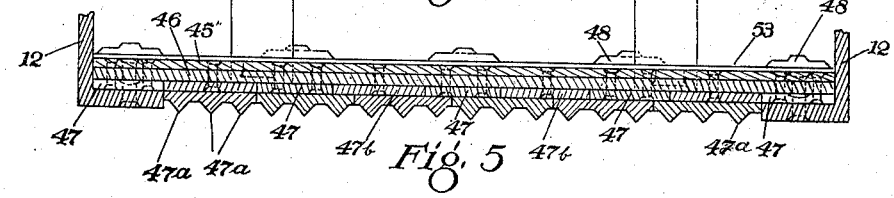

Jan. 21, 1930.  H. F. JOSEPH  1,744,475
WEEDING AND SUBTILLING MACHINE
Filed May 12, 1927  5 Sheets-Sheet 4
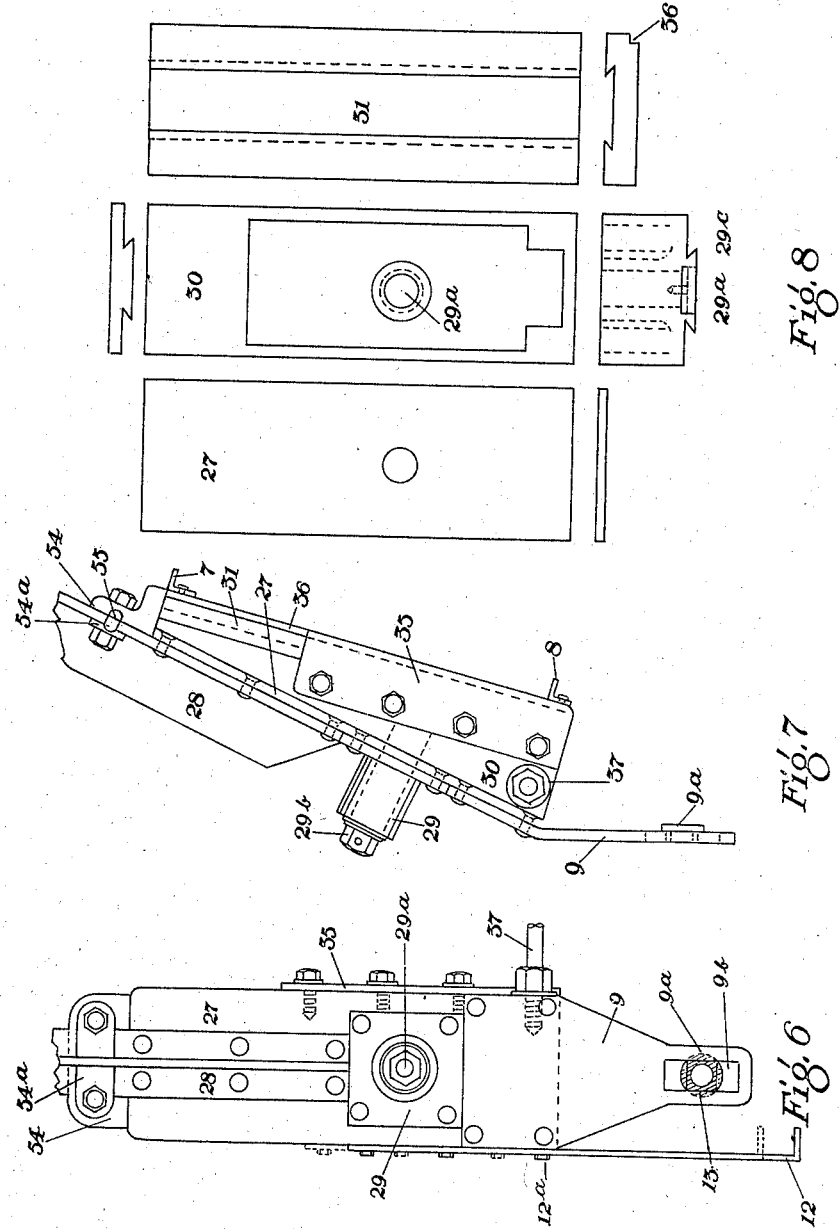

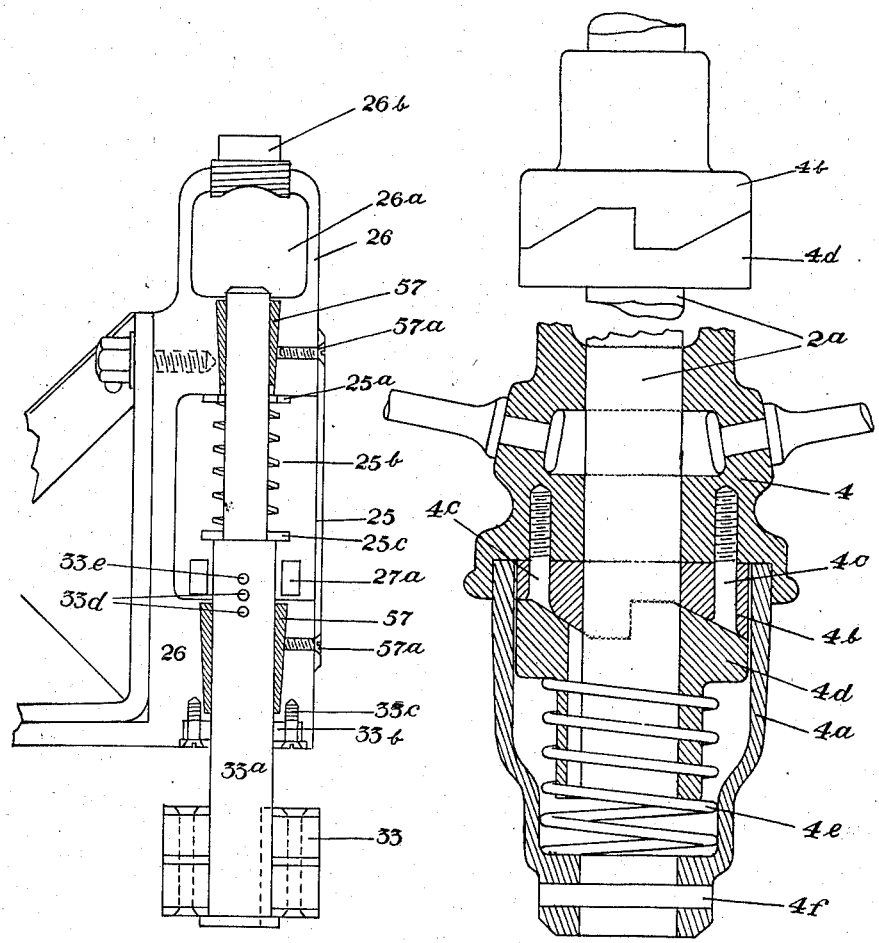

Patented Jan. 21, 1930

1,744,475

UNITED STATES PATENT OFFICE

HARRY F. JOSEPH, OF DAVENPORT, IOWA, ASSIGNOR OF ONE-HALF TO GEORGE A. YEGGY, OF DAVENPORT, IOWA

WEEDING AND SUBTILLING MACHINE

Application filed May 12, 1927. Serial No. 190,822.

My invention relates to an improvement in weeding and sub-tilling machines.

The objects of my invention are to provide an effective machine for use in so-called dry-farming regions which will destroy the weeds by cutting off the roots below the surface and which will also stir and loosen up the soil below the surface. I also provide a roller to smooth the surface of the soil and break up the lumps and clods when desired.

It is well-known that in the so-called dry-farming regions, it is necessary to till the soil below the surface so as to allow the free entry of water during the period of such rains as may occur and also to keep the surface covered with a so-called dust mulch to prevent the free evaporation of the moisture,—in other words, to keep the surface covered with fine dry soil free from clods and lumps,—and to pack the soil at a distance below the surface to permit the moisture to rise to the top of the sub-packed portion of the soil.

I attain these objects by the means illustrated in the accompanying drawings, in which,—

Figure 1:
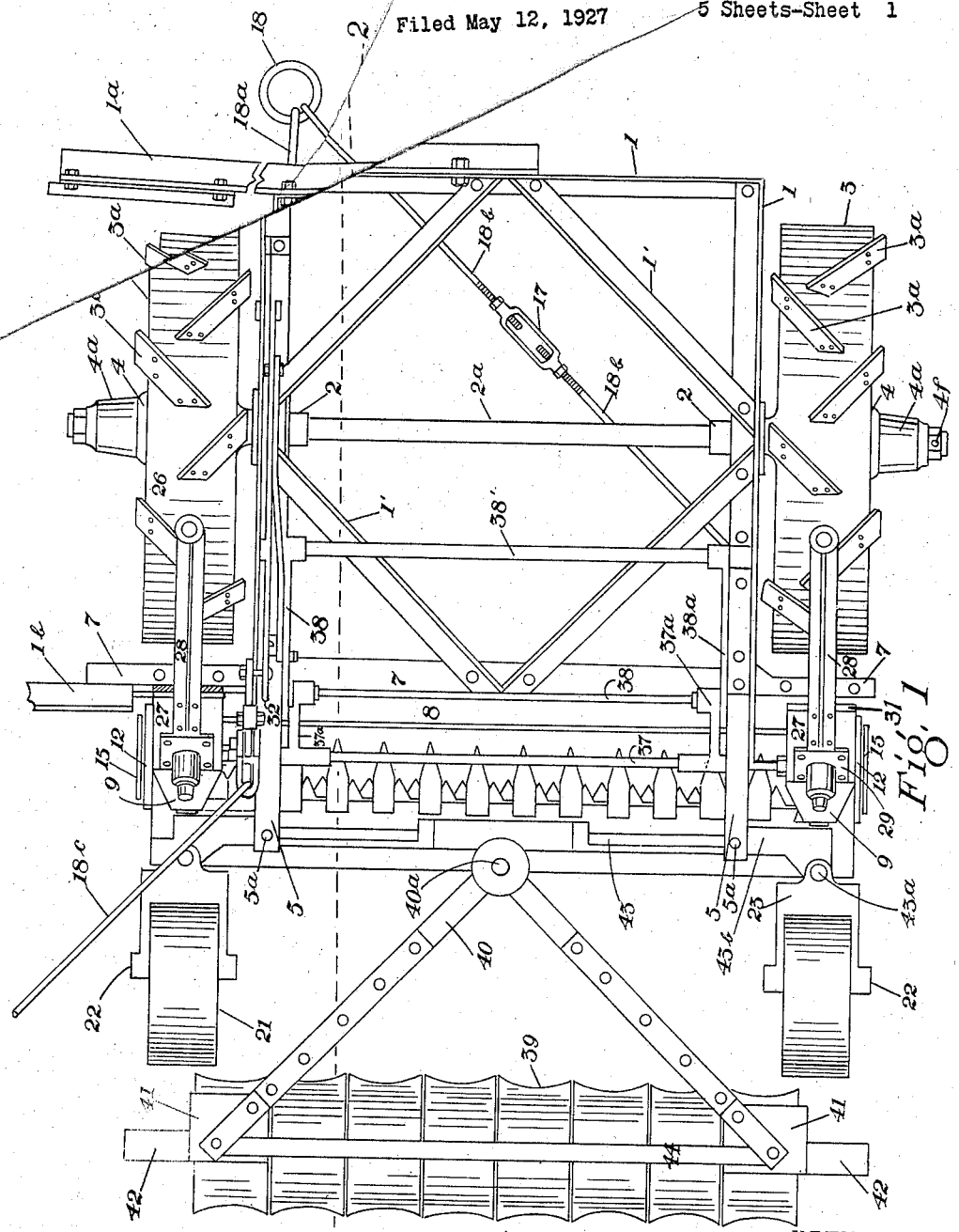
Figure 2:
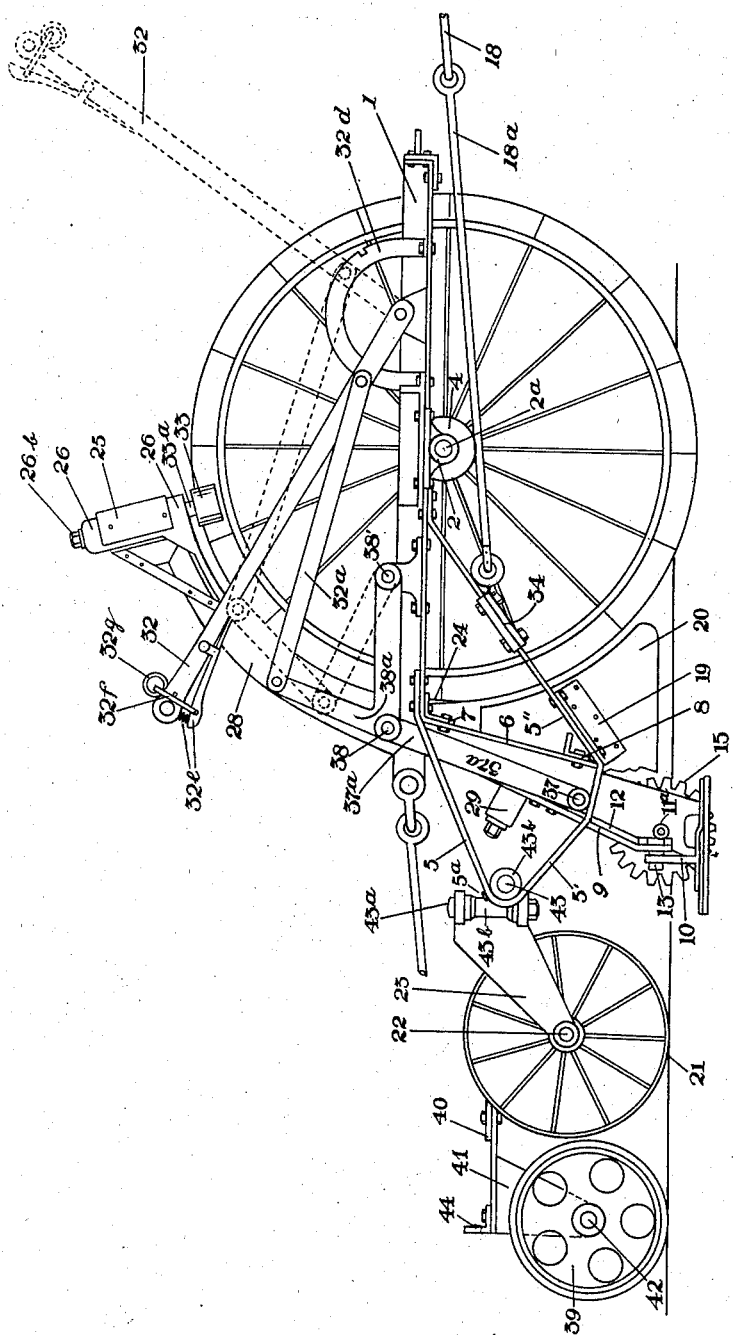

Figure 1 is a plan view of my invention, but showing the extensions by which additional units could be connected, broken off; Figure 2 is a sectional elevation on the line 2—2 of Figure 1, but showing in dotted lines the levers and linkage in the position they occupy when the tilling elements are lifted above the ground; Fig. 3 is an enlarged detail plan view of the ground breakers and cutting blades, but shortened and with the number of teeth reduced to allow representation on a single sheet; Fig. 4 is an enlarged detail section view of the ground breakers and stirring mechanism on the line 4—4 of Figure 3; Fig. 5 is an enlarged sectional elevation of the ground breaking, stirring and cutting mechanism on the line 5—5 of Figure 3 shortened to correspond to Fig. 3; Figures 6 and 7 are enlarged detail views of the driving levers showing their pivot mounting and the connection with the cutter-bar bosses, showing rear and side elevation respectively; Fig. 8 shows enlarged details of different elements of the swivel block construction; Fig. 9 is an enlarged detail partly in section of the clutch assembly united to the left hub of the machine looking from above; Fig. 10 is an enlarged detail partly in section of the rocker arm head.

Similar numerals refer to similar parts throughout the several views.

My invention comprises a pair of large cam drive wheels, 3, preferably of metal, mounted upon an axle-shaft, 2ª, which in turn carries a horizontal main frame, 1 and 1', the rear end of which is supported by a pair of caster wheels, 21.

The tilling and weeding apparatus is carried by an auxiliary frame. The main frame, 1, is preferably composed of angle-irons and the rear ends of the sidebars of the frame, 1, extend downwardly as at 6 and the lower ends of the parts, 6, are securely riveted to an angle-iron, 8, which extends transversely of the machine and forms the rear of the main frame.

A similar transverse angle-iron, 7, connects the sidebars of the main frame at the point where they turn downwardly to form the extension, 6. These angle-irons are preferably riveted to the frame angle-irons, but it is obvious that they may be bolted or secured in any other suitable manner. The transverse angle-irons, 7 and 8, extend laterally beyond the sidebars of the main frame, 1, approximately to the outer line of the wheels, the angle-irons, 7, extending out to each side a little farther than the angle-irons, 8.

Sub-frames, 5, 5', and 5'', are secured on either side of the machine to the rear of the main frame and are linked together by a shaft, 43, which is mounted in caster supports, 43ᵇ, which are secured to the sub-frames, 5, at the rear angle thereof by cap-screws, 5ª. The caster wheels, 21, are secured to yokes, 23, by pins or axles, 22, and the yokes, 23, embrace the vertical portion of the caster, 43ᵇ, and are pivotally mounted thereon by a pivot or bolt, 43ª.

Near the outer ends of the transverse angle-irons, 7 and 8, fixed supporting plates, 31, are riveted or bolted to the angle-irons, and triangular castings, 30, are slidingly mounted upon and dovetailed into longitudinal beveled grooves in the fixed plates, 31, and are held in place by sideplates, 35, which are secured to the sliding triangular castings, 30, and have a flange upon one edge thereof which fits into and slides in the grooves, 36, formed in the front inner edge of the fixed plates, 31. Secured in the triangular castings, 30, by a drive fit or other suitable means, are kingbolts, 29$^a$. The front end of each kingbolt is preferably formed with a shoulder, and the rear end passes through a brass hub, 29, and is secured to it by a nut, 29$^b$, which may be locked on by a cotter-pin or other suitable means.

Each brass hub, 29, is formed integral with a square base which is bolted or otherwise secured to a steel plate, 27. The upper end of each steel plate, 27, is bolted or riveted to the lower end of an arm, 28, which is preferably of steel and T-shaped in section. At the upper end of each arm, 28, is secured a housing, 26, in which is mounted a shaft or spindle, 33$^a$, which carries upon its lower end a head or roller, 33, in any suitable manner. Tapered bushings, 57, are preferably split to allow for contraction.

A collar, 25$^a$, is secured around the spindle shortly below the upper bushing against which one end of a coiled compression spring, 25$^b$, bears and a similar collar, 25$^c$, surrounds the spindle and rests upon a shoulder thereof against which the lower end of the spring, 25$^b$, rests, thus exerting a moderate spring pressure downwardly upon the spindle.

The head, 26, contains at the upper end thereof an oil well, 26$^a$, in which grease or oil is placed and the upper end of the oil hole is closed by a screw plug, 26$^b$, which may be turned down to force the grease into bearings.

A felt washer, 33$^b$, surrounds the spindle at the lower end of the head, 26, which is secured in place by an annular metal plate fastened to the head by set screws, 33$^c$.

The wheel or roller upon the lower end of the shaft may be of steel or any other suitable material, but I prefer to form it with an assembly of metal plates enclosing between them strips of oiled hard maple or other suitable material in order to make it run quietly.

Secured to the circumference of the cam drive wheels, 3, are cams, 3$^a$, which are preferably composed of angle-iron and bolted or riveted to the face of the rim of the wheels obliquely and with the rear ends of the cams somewhat overlapping.

The flanges of the angle-iron cams project from the wheels in radial lines and are of a height approximately equal to the depth of the roller, 33, so that when the machine is drawn forward and the wheels turn in the forward direction, the rollers, 33, will be driven alternately from right to left by the cams, 3$^a$.

To the lower end of each of the steel plates, 27, is secured an operating lever, 9, the upper end of which is a broad plate and the lower end of which is provided with a longitudinal slot, 9$^b$, adapted to receive a wristpin, 13, which connects it to a reciprocating block, 10 or 10$^a$. The reciprocating block, 10, is secured to the left end of the top or upper cutter-bar, 50, and is connected to the left rocking-bar lever, 9. The reciprocating block, 10$^a$, is secured to the right end of the lower cutter-bar, 51, and is connected to the right rocking-bar lever, 9.

The cutter-bars, 50 and 51, are provided with teeth, 50' and 51', which reciprocate simultaneously in opposite directions and thus stir the ground and cut off the roots of the weeds with which they come in contact. They are designed to travel a few inches below the surface of the ground so as to effectively cut the weed roots, thus cutting off their supply of moisture and causing them to die, while leaving the upper portion of the weeds lying on the ground to act to some extent as a mulch and protect it from drying out.

The cutter-bar, 51, slides upon the plates, 47 and 47$^b$, and the cutter-bar, 50, slides upon a portion of the cutter-bar, 51. A plurality of land-breaking points, 48, which extend in front of the teeth of the cutter-bars are provided with horizontal openings through which the teeth of the cutter-bars may move back and forth, and are secured to the plates, 47. A pair of supporting plates, 45 and 46, extend lengthwise of the tilling assembly and the cover plate and to these plates the various plates, 47, 47$^a$ and 47$^b$, are secured by bolts or rivets. The cover plate, 53, is also secured to the plates 45 and 46. The ends of the cutter-bar assembly are bolted to the hangers, 12, which support the cutter-bar assembly. The upper ends of the hangers, 12, are connected to the triangular castings, 30, in which also are secured the ends of a lifting rod or shaft, 37, which extends transversely of the machine and is in turn supported by links, 37$^a$, the upper ends of which are mounted upon a tumbling shaft, 38.

The tumbling shaft, 38, is mounted in the angle of a pair of bellcrank levers, 38$^a$, the front ends of which are secured to a shaft, 38', mounted in the main frame. The vertical arm of the bellcrank lever, 38$^a$, is pivoted to one end of a link, 32$^a$, the other end of which is pivoted to the operating lever, 32, which in turn has its lower end pivoted to the sidebars, 1, of the main frame. The operating lever, 32, is provided with a handle pivoted near the outer end thereof, which in turn is connected in the ordinary manner by a link, to a dog, which engages notches in the quadrant, 32$^d$, mounted upon the main frame, 1. A spring, 32$^e$, is mounted between the handle and lever to hold the handle out from the lever and secure the dog in its latched position.

A loop, 32$^f$, is secured to the handle carrying a ring, 32ᵍ, to which a rope may be attached whereby the driver of a tractor hauling this implement may pull the operating lever forward while riding on the tractor.

A suitable seat may be mounted upon the frame in the usual manner.

In order to pack the soil at a point some distance below the surface, I provide corrugated or triangular-shaped packers, 47ᵃ, which are secured to the lower face of the tilling assembly. These packers operate to close any openings there may be in the ground underneath the cultivated surface and thus tend to hold the moisture from escape by evaporation through such openings. The moisture can thus rise to the line of the sub-packed soil and cannot escape therefrom by reason of the lightly packed, dry earth or dust mulch on top of it. It is well known that in many of the semi-arid or so-called dry-farming districts with a rainfall of six inches or more between January 1st and June 15th, it is possible to produce thirty bushels of wheat or more to the acre and that where proper surface tilling and packing is carried on and a dust mulch produced, the same yield can be produced on a much smaller rainfall. In such cases the removal of the dust mulch within a period of five or six weeks without rain, will disclose the top of the sub-packed soil moist up to the top of the sub-packed line or to the bottom of the dust mulch.

In order to smooth the surface of the soil and break up lumps, I provide a smoothing roller or packer, 39, which may be formed of a single roller or of a plurality of packer wheels mounted upon the shaft, 42. These wheels may have their peripheries flat or curved to any extent desired. The shaft, 42, is held in combined brackets and journals, 41, which in turn are linked to the frame by bars, 40, the front ends of which are connected by a swivel joint, 40ᵃ, to the rear end of the main frame of the machine. A cross-tie rod, 44, connects the brackets, 41.

In order to cover as much ground as possible with a single tractor, a plurality of these machines may be hooked onto one tractor. I have shown a tractor connection by a ring, 18, connected to the sub-frame by links, 18ᵃ and 18ᵇ, 18ᵃ having a hook formed upon its rear end which engages an eye formed integral with a drawbar, 34, which is bolted to the sub-frame member, 5″, and the link, 18ᵇ, being similarly connected to the sub-frame. The links are united by a turnbuckle, 17, by which the pull may be adjusted to avoid side draft. I have shown extensions to the frame, 1ᵃ, and 1ᵇ, which may extend out to the left to afford an attachment for another machine to follow this at one side and slightly to the rear and an additional link, 18ᶜ, has an additional connection for such additional machine.

The cam drive wheels, 3, are secured upon the axle-shaft, 2ᵃ, by hub caps, 4. In order to allow the machine to turn readily, I have provided clutches for each of the cam drive wheels. Figure 9 shows an enlarged detail view of the right clutch partly in section looking at it from above. The hub, 4, is provided with a central opening through which the axle-shaft, 2ᵃ, passes and upon which the hubs are designed to fit closely. One clutch member, 4ᵇ, is secured to the outer end of the hub, 4, by cap screws, 4ᶜ. The other clutch member, 4ᵈ, is slidingly mounted upon the outer end of the axle-shaft and is spring-held into engagement with the inner clutch member by a helical compression spring, 4ᵉ, one end of which bears against the outer clutch member and the other end of which bears against the hub cap, 4ᵃ. The hub cap may be held in place upon the shaft by a pin, 4ᶠ.

The clutch members are so shaped that the wheels cannot revolve forward without carrying the axle-shaft, 2ᵃ, with them but either wheel can remain stationary and allow the axle-shaft to be turned in a forward direction, such motion disengaging the clutch of the stationary wheel.

This arrangement is provided for the purpose of synchronizing to a large extent the movement of the two wheels and the resulting movement of the rocker arms and cutter-bars. It should be noted, however, that the cutter-bars move entirely independently of each other and that there is no fixed connection between the right rocker arm and the left rocker arm so that no injury to the machine could result from the right and left wheels not being timed exactly together.

In order to clean out any dirt or weeds that may accumulate on the cam drive wheels, I attach a knife or scraper, 24, to the frame close to the line of travel of the outer edge of the cams. A weed guard, 20, consisting of an irregular triangular plate secured to the sub-frame, 5″, by angle braces, 19, is provided and I also mount at each end of the cutter-bar a circular-toothed weed cutter, 15, mounted upon a shaft or pivot, 11ᵃ, secured in the hanger plate, 12.

In the operation of my machine a tractor or other motive power is attached and as the machine is drawn forward, the operating lever is pulled backward into the position shown in solid lines in Figure 2, causing the earth-breaking teeth to dig into the ground and the cutter-bars to dig their way into the earth to the desired distance.

As the machine is drawn forward, the action of the cams upon the rollers in the heads, 26, upon the upper ends of the rocker bars or levers, 28, etc., causes these levers to oscillate upon the pivots, 29, and transmit a reciprocating longitudinal movement to the respective cutter-bars to which they are connected.

When the end of the field is reached and it is desired to turn around, the operating lever, 32, is thrown into the forward position shown in dotted lines in Figure 2. This raises the whole cutter-bar assembly from the ground and raises the head, 26, with the roller, 33, mounted thereon, out of engagement with the cams, 3ª, and the machine can then be readily turned. In loose soils it may not even be necessary to raise the cutter-bar assembly out of the ground to make the turn, but there is obviously less danger of breakage if it is raised.

The depth to which the cutter-bar assembly may descend in the operation of my device may be governed by the vertical adjustment of the hangers, 12, Figure 6 showing in dotted lines the position of the hangers in the upwardly adjusted position and the solid lines showing the position of the hangers, 12, at normal depth. A plurality of bolt holes is provided in the triangular castings, 30, to receive the bolts, 12ª, in the different adjusted positions in which the hangers, 12, may be placed.

Another adjustment by which additional depth for the cutter-bar assembly may be gained, is provided by drilling a plurality of holes in the spindle, 33ª, which spindle is normally secured to the adjusting collar, 27ª, by a pin, 33ᶜ, which extends through the collar and spindle. When desired to lower the head, 26, so as to attain still greater depth of the cutter-bar assembly, the pin, 33ᶜ, can be withdrawn and the spindle, 33ª, raised and the pin re-inserted in one of the lower holes, 33ᵈ, and the corresponding pin hole in the collar, 27ª, thus lowering the head, 26, relative to the circumference of the adjacent cam drive wheel.

I claim:

1. A sub-surface tilling machine comprising a pair of driving wheels, an axle with a main frame mounted thereon, a sub-frame connected to the main frame and carrying a reciprocable cutter-bar mounted therein, a rocker-arm pivotally mounted upon the main frame having its lower end pivotally connected to one end of the cutter-bar, a cam driven member united to the upper end of the rocker-arm, a plurality of staggered oppositely-inclined cams mounted upon the tread of one of the driving wheels at an acute angle to a vertical plane extending through the middle of the driving wheel at right angles to the axle thereof and adapted to drive the rocker arm in alternately opposite directions.

2. A sub-surface tilling machine comprising a pair of driving wheels, an axle with a main frame mounted thereon, a sub-frame connected to the main frame and carrying a reciprocable cutter-bar mounted therein, a rocker-arm pivotally mounted upon the main frame having its lower end pivotally connected to one end of the cutter-bar, a spindle mounted in the upper end of the rocker-arm with a small wheel united to the lower end of the spindle, a plurality of staggered oppositely-inclined cams mounted upon the tread of one of the driving wheels at an acute angle to a vertical plane extending through the middle of the driving wheel at right angles to the axle thereof and adapted to drive the rocker arm in alternately opposite directions.

3. A sub-surface tilling machine comprising a pair of driving wheels, an axle with a main frame mounted thereon, a sub-frame connected to the main frame and carrying a pair of reciprocable cutter-bars mounted therein, rocker-arms pivotally mounted upon either side of the main frame having their lower ends pivotally connected to the cutter-bars respectively, a cam contact member mounted in the upper end of each rocker-arm, a plurality of staggered oppositely-inclined cams mounted upon the tread of the driving wheels and adapted to drive the rocker arms in alternately opposite directions.

4. A sub-surface tilling machine comprising a pair of driving wheels, an axle with a main frame mounted thereon, a sub-frame connected to the main frame and carrying a pair of reciprocable cutter-bars mounted therein, rocker-arms pivotally mounted upon either side of the main frame having their lower ends pivotally connected to the cutter-bars respectively, a spindle mounted in the upper end of each rocker-arm with a small wheel united to the lower end of the spindle, a plurality of staggered oppositely-inclined cams mounted upon the tread of the driving wheels and adapted to drive the rocker arms in alternately opposite directions.

5. A sub-surface tilling machine comprising a pair of driving wheels, an axle with a main frame mounted thereon, a sub-frame connected to the main frame and carrying below the surface of the ground a series of stirring teeth spaced apart, a pair of reciprocable cutter-bars mounted adjacent said teeth, rocker-arms pivotally mounted upon either side of the main frame having their lower ends pivotally connected to the cutter-bars respectively, a spindle mounted in the upper end of each rocker-arm with a small wheel united to the lower end of the spindle, a plurality of staggered oppositely-inclined cams mounted upon the tread of the driving wheels and adapted to drive the rocker arms in alternately opposite directions.

6. A sub-surface tilling machine comprising a pair of driving wheels, an axle with a main frame mounted therein, a sub-frame connected to the main frame and carrying reciprocable cutter-bars mounted therein, a plurality of oppositely-inclined cams staggeredly mounted upon the tread of the driving wheels, and means mounted upon the frame by which the cams can transmit a longitudinal reciprocating movement to the cutter-bars.

7. A sub-surface tilling machine comprising a pair of driving wheels, an axle with a main frame mounted thereon, a sub-frame connected to the main frame and carrying reciprocable cutter-bars mounted therein, and means mounted upon the frame and actuated by the driving wheels to give the cutter-bars a longitudinal reciprocating movement.

8. A sub-surface tilling machine comprising a pair of driving wheels, an axle with a main frame mounted thereon, a plurality of oppositely-inclined cams staggeredly mounted upon the tread of the driving wheels, rocker-arms pivotally mounted upon the main frame carrying cam contact members secured upon their upper ends adapted to engage the aforesaid cams and be actuated thereby, a sub-frame connected to the main frame, reciprocably movable earth stirring members mounted upon the sub-frame and means whereby such members may be actuated by the rocker-arms.

9. A sub-surface tilling machine comprising a pair of driving wheels mounted upon an axle, a main frame mounted thereon, a pair of stirring wheels secured by caster mountings to the rear of the main frame, a sub-frame connected to the main frame and carrying a reciprocable cutter-bar mounted therein, a rocker-arm pivotally mounted upon the main frame having its lower end pivotally connected to one end of the cutter-bar, a cam driven member united to the upper end of the rocker-arm, a plurality of staggered oppositely-inclined cams mounted upon the tread of one of the driving wheels at an acute angle to a vertical plane extending through the middle of the driving wheel at right angles to the axle thereof and adapted to drive the rocker arm in alternately opposite directions.

10. A sub-surface tilling machine comprising a pair of driving wheels mounted upon an axle, a main frame mounted thereon, a pair of stirring wheels secured by caster mountings to the rear of the main frame, a sub-frame connected to the main frame and carrying a reciprocable cutter-bar mounted therein, a rocker-arm pivotally mounted upon the main frame having its lower end pivotally connected to one end of the cutter-bar, a cam driven member united to the upper end of the rocker-arm, a plurality of staggered oppositely-inclined cams mounted upon the tread of one of the driving wheels at an acute angle to a vertical plane extending through the middle of the driving wheel at right angles to the axle thereof and means for adjusting the depth of the cutter-bars below the surface of the soil and adapted to drive the rocker arm in alternately opposite directions.

11. A sub-surface tilling machine comprising a pair of driving wheels, an axle with a main frame mounted thereon, a sub-frame connected to the main frame and carrying a reciprocable cutter-bar and a sub-surface packer mounted therein, a rocker-arm pivotally mounted upon the main frame having its lower end pivotally connected to one end of the cutter-bar, a spindle mounted in the upper end of the rocker-arm with a small wheel united to the lower end of the spindle, a plurality of staggered oppositely-inclined cams mounted upon the tread of one of the driving wheels at an acute angle to a vertical plane extending through the middle of the driving wheel at right angles to the axles thereof and adapted to drive the rocker-arm in alternately opposite directions.

12. A sub-surface tilling machine comprising a pair of supporting wheels, an axle with a main frame mounted thereon, a sub-frame connected with the main frame and carrying a sub-surface blade provided on its under side with a sub-soil packer and having stirring means mounted thereon.

13. In a sub-surface tilling machine, the combination with a pair of supporting wheels with an axle and main frame mounted thereon, of a sub-frame secured to the main frame, a sub-surface blade united to the sub-frame and provided on its under side with a sub-soil packer, and stirring means secured to the sub-frame.

In testimony whereof he affixes his signature.

HARRY F. JOSEPH.